(12) United States Patent
Kim et al.

(10) Patent No.: US 11,419,000 B2
(45) Date of Patent: Aug. 16, 2022

(54) DEVICE AND METHOD FOR RESOURCE ALLOCATION IN WIRELESS COMMUNICATION SYSTEM

(71) Applicant: Samsung Electronics Co., Ltd., Suwon-si (KR)

(72) Inventors: Yongsang Kim, Seoul (KR); Sungkwon Jo, Suwon-si (KR); Jeongheon Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 17 days.

(21) Appl. No.: 16/628,792

(22) PCT Filed: Jun. 27, 2018

(86) PCT No.: PCT/KR2018/007259
§ 371 (c)(1),
(2) Date: Jan. 6, 2020

(87) PCT Pub. No.: WO2019/009559
PCT Pub. Date: Jan. 10, 2019

(65) Prior Publication Data
US 2020/0205028 A1   Jun. 25, 2020

(30) Foreign Application Priority Data
Jul. 7, 2017   (KR) .......................... 10-2017-0086559

(51) Int. Cl.
*H04W 28/02* (2009.01)
*H04W 72/04* (2009.01)
*H04W 80/06* (2009.01)

(52) U.S. Cl.
CPC ....... *H04W 28/0278* (2013.01); *H04W 72/04* (2013.01); *H04W 80/06* (2013.01)

(58) Field of Classification Search
None
See application file for complete search history.

(56) References Cited

U.S. PATENT DOCUMENTS

| | | | |
|---|---|---|---|
| 2008/0084851 A1* | 4/2008 | Kim | H04W 72/048 370/336 |
| 2011/0122862 A1 | 5/2011 | Yun et al. | |
| 2011/0306351 A1 | 12/2011 | Pettersson et al. | |

(Continued)

FOREIGN PATENT DOCUMENTS

| | | |
|---|---|---|
| KR | 10-2008-0099123 A | 11/2008 |
| KR | 10-2009-0017445 A | 2/2009 |
| WO | 2016/104920 A1 | 6/2016 |

OTHER PUBLICATIONS

Korean Notice of Patent Grant dated May 25, 2022, issued in Korean Application No. 10-2017-0086559.

*Primary Examiner* — Kouroush Mohebbi
(74) *Attorney, Agent, or Firm* — Jefferson IP Law, LLP

(57) ABSTRACT

The present disclosure generally relates to a radio resource allocation of a base station in a wireless communication system, and an operating method of a base station comprises the steps of: determining a buffer state estimation value of a terminal on the basis of whether the terminal is in an uplink talk spurt; allocating an uplink radio resource for the terminal on the basis of the buffer state estimation value; and transmitting information on the allocated uplink radio resource to the terminal.

20 Claims, 6 Drawing Sheets

(56) References Cited

U.S. PATENT DOCUMENTS

2012/0127891 A1* 5/2012 Landstrom ........ H04W 72/1221
370/252
2017/0019918 A1 1/2017 Voigt et al.

* cited by examiner

DEVICE AND METHOD FOR RESOURCE ALLOCATION IN WIRELESS COMMUNICATION SYSTEM

TECHNICAL FIELD

The present disclosure generally relates to resource allocation in a wireless communication system, and more particularly, relates to a device and method for uplink radio resource allocation in a wireless communication system.

BACKGROUND ART

In the past, a voice telephony service in a mobile communication system was provided through a public switched telephone network (PSTN). However, due to the recent growth of telecommunication technologies, a broadband mobile data communication service has been made possible and accordingly to this, a data communication-based voice telephony service, i.e., a voice over Internet protocol (VoIP) service is being provided. Accordingly, a user can use VoIP telephony through an access network which provides IP connectivity.

At present, a long term evolution (LTE) system being a 4th generation (4G) mobile communication system supports the VoIP service, too. The VoIP service provided through the LTE system is also called 'voice over LTE (VoLTE)'. In comparison to the past 3rd generation (3G) voice telephony, this VoLTE service uses a wide bandwidth and a high quality audio codec and thus, its telephony quality is excellent. Also, the ongoing VoLTE voice telephony is possible to be converted into video telephony as well. The VoLTE video telephony is possible to provide a high definition (HD) service of providing a resolution eight times or more than that of 3G video telephony. To provide this real-time service based on data communication, it is required to properly control a data transmission delay.

DISCLOSURE OF INVENTION

Technical Problem

On the basis of the above-described discussion, the present disclosure provides a device and method for resource allocation in a wireless communication system.

Also, the present disclosure provides a device and method for uplink radio resource allocation in a wireless communication system.

Also, the present disclosure provides a device and method for identifying radio resource allocation even without a request for resource allocation for an uplink talk spurt in a wireless communication system.

Also, the present disclosure provides a device and method for estimating a buffer state of a terminal in consideration of whether the terminal is in an uplink talk spurt, and a buffer state update cycle, and allocating an uplink radio resource for the terminal on the basis of a buffer state estimation value.

Solution to Problem

According to various embodiments of the present disclosure, an operating method of a base station in a wireless communication system includes identifying a buffer state estimation value of a terminal on the basis of whether the terminal is in an uplink talk spurt, allocating an uplink radio resource for the terminal on the basis of the buffer state estimation value, and transmitting information on the allocated uplink radio resource to the terminal According to various embodiments of the present disclosure, a base station apparatus in a wireless communication system includes at least one processor configured to identify a buffer state estimation value of a terminal on the basis of whether the terminal is in an uplink talk spurt, and allocate an uplink radio resource for the terminal on the basis of the buffer state estimation value, and a transmitting/receiving unit configured to transmit information on the allocated uplink radio resource to the terminal.

Advantageous Effects of Invention

A device and method of various embodiments of the present disclosure may prevent a delay of uplink resource allocation for a terminal in a wireless communication system in which a plurality of terminals produce radio resource allocation competition. Particularly, by preventing the delay of the radio resource allocation for the terminal, a real-time service such as voice over Internet protocol (VoIP) may wholly prevent a deterioration of a service quality. Also, by decreasing the delay of the radio resource allocation for the terminal, a voice service user capability may be increased.

An effect obtainable from the present disclosure is not limited to the above-mentioned effects, and other effects not mentioned will be able to be apparently understood from the following statement by a person having ordinary skill in the art to which the disclosure pertains.

BEST MODE FOR CARRYING OUT THE INVENTION

Terms used in the present disclosure are used to just describe specific embodiments, and may not have an intention to limit the scope of other embodiments. The expression of a singular form may include the expression of a plural form unless otherwise dictating clearly in context. The terms used herein including the technological or scientific terms may have the same meanings as those generally understood by a person having ordinary skill in the art mentioned in the present disclosure. Among the terms used in the present disclosure, terms defined in a general dictionary may be interpreted as the same or similar meanings as the contextual meanings of a related technology, and are not interpreted as ideal or excessively formal meanings unless defined clearly in the present disclosure. According to cases, even the terms defined in the present disclosure may not be construed as excluding embodiments of the present disclosure.

In various embodiments of the present disclosure described below, a hardware access method is explained as an example. However, various embodiments of the present disclosure include a technology using all of hardware and software, so various embodiments of the present disclosure do not exclude a software based access method.

Below, the present disclosure relates to a device and method for identifying retransmission of data between base stations in a wireless communication system. In detail, the present disclosure explains a technology for allocating an uplink radio resource by means of buffer state estimation even without an uplink radio resource allocation request of a terminal in a wireless communication system, to prevent a delay of data transmission and/or reception.

In the description below, the term denoting network entities, the term (e.g., uplink (UL) grant, etc.) denoting control information, the term denoting a constituent element of a device, the term (e.g., a scheduling request (SR), a buffer status report (BSR), etc.) denoting a communication message, the term denoting a communication technology, etc. are exemplified for description convenience's sake. Accordingly, the present disclosure is not limited to the terms described later, and may use other terms having equivalent technological meanings.

Also, the present disclosure explains various embodiments by using a long term evolution (LTE) system and an LTE advance (LTE-A) system, but this is merely an example for explanation. Various embodiments of the present disclosure may be easily modified and applied even to other communication systems.

Figure 1:
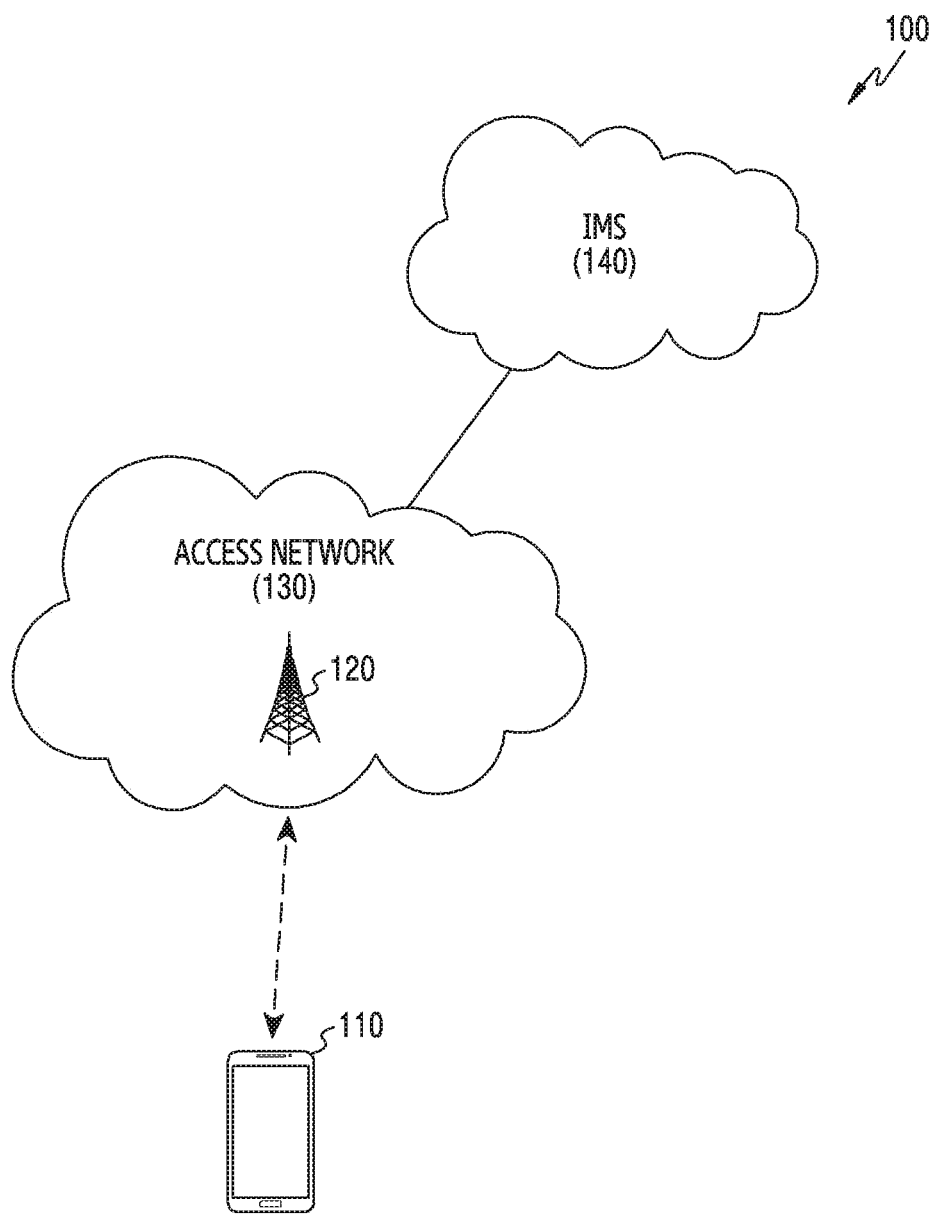
FIG. 1 illustrates a wireless communication system according to various embodiments of the present disclosure.

FIG. 1 illustrates a wireless communication system according to various embodiments of the present disclosure. FIG. 1 illustrates, as some of nodes that use a wireless channel in the wireless communication system 100, a terminal 110, an access network 130 including a base station 120, and an IP multimedia subsystem (IMS) 140.

The terminal 110, a user device, performs communication with the base station 120 through a wireless channel. The terminal 110 provides a voice over Internet protocol (VoIP) function, and executes an application for a VoIP service according to a user's command. Accordingly to this, the terminal 110 may transmit and receive a voice packet for the VoIP service with the base station 120. In various embodiments, the terminal 110 may be a portable electronic device, and may be one of a smart phone, a portable terminal, a mobile phone, a mobile pad, a media player, a tablet computer, a handheld computer or a personal digital assistant (PDA). In other embodiments, the terminal 110 may be a stationary device. Also, the terminal 110 may be a device that combines functions of two or more of the aforementioned devices.

The base station 120 provides wireless access to the terminal 110. The base station 120, which is one of entities constructing the access network 130, has coverage including a predetermined geographical range. The base station 120 may be denoted as, besides the base station, an 'access point (AP)', an 'evolved nodeB (eNB)', a '5th generation node (5G node)', a 'wireless point', a 'transmission/reception point (TRP)' or other terms having technological meanings equivalent to these.

The access network 130 is a system for connecting the terminal 110 to an external network (e.g., an Internet protocol (IP) network), and may further include other entities such as a serving gateway (S-GW), a packet data network gateway (P-GW), a mobile management entity (MME), etc. as well as the base station 120.

The IMS 140 is a subsystem managing a session. The IMS 140 may be operated independently from the access network 130. The IMS 140 may provide a multimedia service such as a voice, an audio, a video, data, etc., on the basis of an IP. In response to the terminal 1110 performing voice telephony with a counterpart through a VoIP service, a voice packet is transmitted and/or received via the IMS 140. In accordance with an embodiment, in response to the terminal 110 being provided with voice over LTE (VoLTE) voice telephony through an LTE network, the voice packet may be transmitted and/or received via the IMS 140. The IMS 140 may include a proxy-call session control function (P-CSCF), a serving-call session control function (S-CSCF), an interrogating-call session control function (I-CSCF), a PCRF, a home subscriber server (HSS), etc.

In accordance with various embodiments of the present disclosure, voice telephony that uses a VoIP service between the terminal 110 and the base station 120 may proceed. At this time, the terminal 110 in which uplink data that will be transmitted is provided transmits a request for radio resource allocation (a request for uplink grant) to the base station 120. In accordance with an embodiment, in compliance with the 3rd generation partnership project (3GPP) standard (Release 8 or above), a means for requesting for uplink radio resource allocation includes a method of transmitting a scheduling request (SR) or a buffer status report (BSR) message. The SR may be transmitted through a physical uplink control channel (PUCCH) and, at transmission of an uplink data channel (physical uplink shared channel), the BSR may be transmitted through a MAC control element (MAC CE).

In accordance with an embodiment, in response to the base station 120 receiving a request for radio resource allocation from the terminal 110, the base station 120 performs resource allocation in compliance with its own radio resource allocation policy. In response to succeeding in resource allocation for the terminal 110, the base station 120 transmits radio resource allocation information (i.e., UL grant) to the terminal 110. At this time, the radio resource allocation information may be transmitted through a physical downlink control channel (PDCCH). The terminal 110 receiving the radio resource allocation information from the base station 120 transmits uplink data to the base station 120 through a corresponding resource. Also, the terminal 110 may transmit a BSR for remnant data except transmission data, together. In response to receiving the BSR, the base station 120 again performs radio resource allocation, and repeats the above processes.

As described above, in the conventional scheme in which the base station 120 receives a request for radio resource allocation such as an SR or a BSR and allocates a radio resource, a delay of allocation can be caused in an environment in which a plurality of terminals produce radio resource allocation competition under a restricted radio resource. In a voice service such as VoLTE of an embodiment, a service quality can be deteriorated due to a delay of radio resource allocation, and this can be straightly the cause of deteriorating a voice user capacity.

However, the present disclosure is not limited only to this VoIP service environment or an LTE environment. In accordance with other embodiments, a method for radio resource allocation proposed in the present disclosure may be applied to all systems providing a real-time service which is sensitive to a data transmission delay.

As described above, in a situation in which a plurality of terminals compete for resource allocation, in response to resource allocation responsive to a request for radio resource allocation for an uplink talk spurt of the terminal 110 being delayed, the transmission of uplink voice data that will be transmitted from the terminal 110 to the base station 120 may be delayed, and this can lead to the occurrence of a problem of deteriorating a voice service quality of the terminal 110. Accordingly, the present disclosure proposes an efficient radio resource allocation method capable of, by predicting an amount of uplink traffic, decreasing a delay of radio resource allocation even while the transmission of radio resource allocation information is delayed.

In accordance with various embodiments of the present disclosure, a base station estimating a buffer state and allocating a radio resource in order to prevent a delay of radio resource allocation for a terminal in a situation in which a plurality of terminals compete for resource allocation may be constructed as in FIG. 2 below, and its procedure may be performed as in FIG. 3 to FIG. 5.

Figure 2:
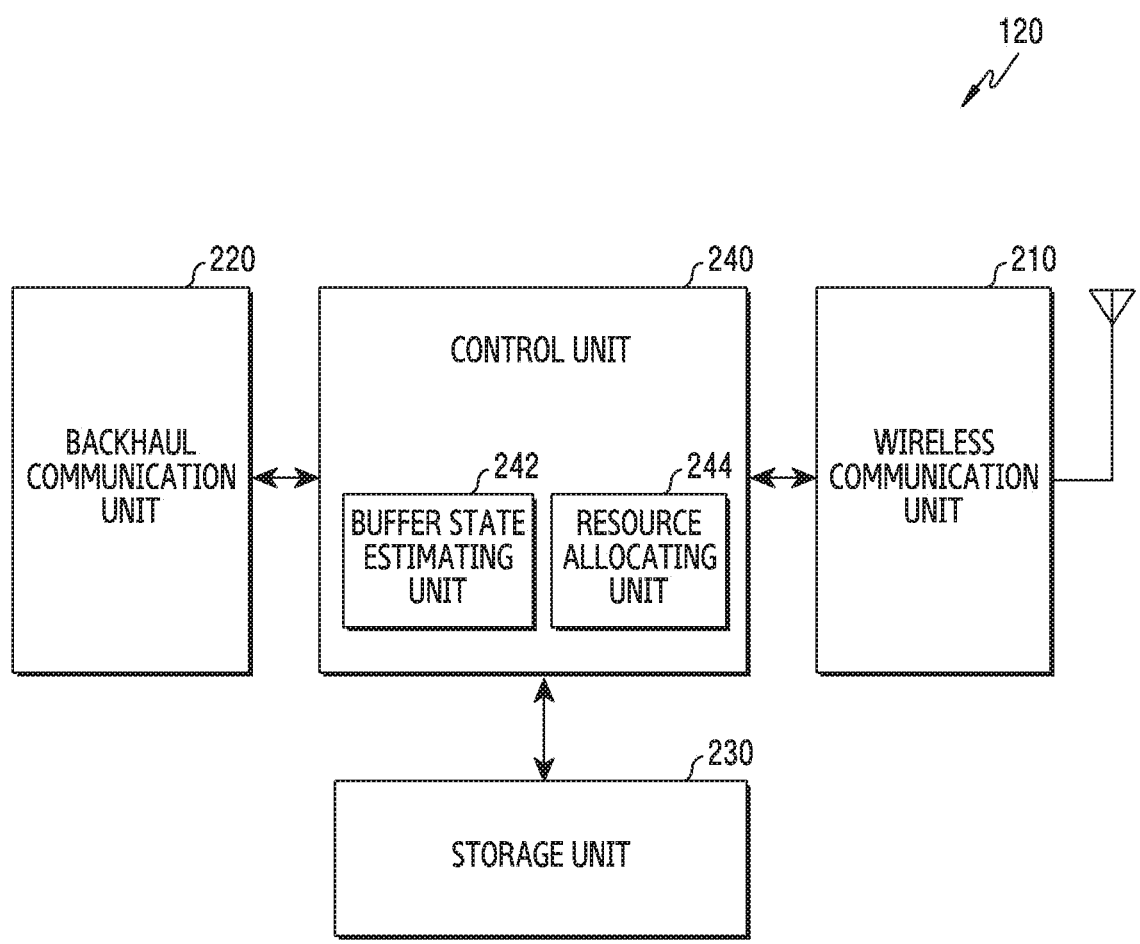
FIG. 2 illustrates a block construction of a base station in a wireless communication system according to various embodiments of the present disclosure.

FIG. 2 illustrates a block construction of the base station 120 in a wireless communication system according to various embodiments of the present disclosure. The terms ' . . . unit', ' . . . er', etc. used below represent the unit of processing at least one function or operation. This may be implemented as hardware or software, or a combination of hardware and software. As illustrated in FIG. 2, the base station 120 includes a wireless communication unit 210, a backhaul communication unit 220, a storage unit 230, and a control unit 240.

The wireless communication unit 210 performs functions for transceiving a signal through a wireless channel. For example, the wireless communication unit 210 performs a function of conversion between a baseband signal and a bit stream in compliance with the physical layer standard of a system. For example, at data transmission, the wireless communication unit 210 provides complex symbols by encoding and modulating a transmission bit stream. Also, at data reception, the wireless communication unit 210 restores a reception bit stream by demodulating and decoding a baseband signal. Also, the wireless communication unit 210 up converts a baseband signal into a radio frequency (RF) band signal and then transmits the RF band signal through an antenna, and down converts an RF band signal received through the antenna into a baseband signal.

For this, the wireless communication unit 210 may include a transmission filter, a reception filter, an amplifier, a mixer, an oscillator, a digital to analog converter (DAC), an analog to digital converter (ADC), etc. Also, the wireless communication unit 210 may include a plurality of transceiving paths. Further, the wireless communication unit 210 may include at least one antenna array comprised of a plurality of antenna elements. In aspect of hardware, the wireless communication unit 210 may be comprised of a digital unit and an analog unit, and the analog unit may be comprised of a plurality of sub-units according to an operation power, an operation frequency, etc.

The wireless communication unit 210 transmits and receives a signal as mentioned above. Accordingly to this, the wireless communication unit 210 may be denoted as a 'transmitting unit', a 'receiving unit' or a 'transceiving unit'. Also, in the following description, transmission and reception performed through a wireless channel are used as a meaning including that the aforementioned processing is performed by the wireless communication unit 210.

The backhaul communication unit 220 provides an interface for performing communication with other nodes in a network. That is, the backhaul communication unit 220 converts a bit stream transmitted from the base station 120 to another node, for example, another connection node, another base station, an upper node, a core network, etc., into a physical signal, and converts a physical signal received from the another node, into a bit stream.

The storage unit 230 stores data such as a basic program for an operation of the base station 120, an application program, setting information, etc. The storage unit 230 may consist of a volatile memory, a non-volatile memory, or a combination of the volatile memory and the non-volatile memory. And, in response to a request of the control unit 240, the storage unit 230 provides the stored data.

The control unit 240 controls general operations of the base station. For example, the control unit 240 may transmit and receive a signal through the wireless communication unit 210 or the backhaul communication unit 220. Also, the control unit 240 records data in the storage unit 230, and reads. For this, the control unit 240 may include at least one processor. For example, the control unit 240 may control the base station 120 to perform operations of various embodiments described later. Particularly, in allocating an uplink radio resource to the terminal in the base station 120 according to various embodiments described later, the control unit 240 estimates a buffer state of the terminal in a predetermined condition and through this, transmits information on allocated radio resource allocation. For this, the control unit 240 may include a buffer state estimating unit 242 and a resource allocating unit 244. For example, the buffer state estimating unit 242 may identify whether to increase a buffer state estimation value as much as a unit size according to an uplink period of the terminal. At this time, in response to a buffer status report (BSR) being received from the terminal, the buffer state estimating unit 242 may update the buffer state estimation value on the basis of the actually received BSR. Also, the resource allocation unit 244 may allocate an uplink radio resource for the terminal on the basis of the buffer state estimation value. In accordance with an embodiment, the buffer state estimating unit 242 and the resource allocating unit 244 may operate as one block. Here, the buffer state estimating unit 242 and the resource allocating unit 244, which are an instruction set or code stored in the storage unit 230, may be an instruction/code at least temporarily resided in the control unit 240 or a storage space storing the instruction/code, or be a part of a circuitry constructing the control unit 240. For example, the control unit 240 controls the base station 120 to perform procedures of various embodiments described later.

Figure 3:
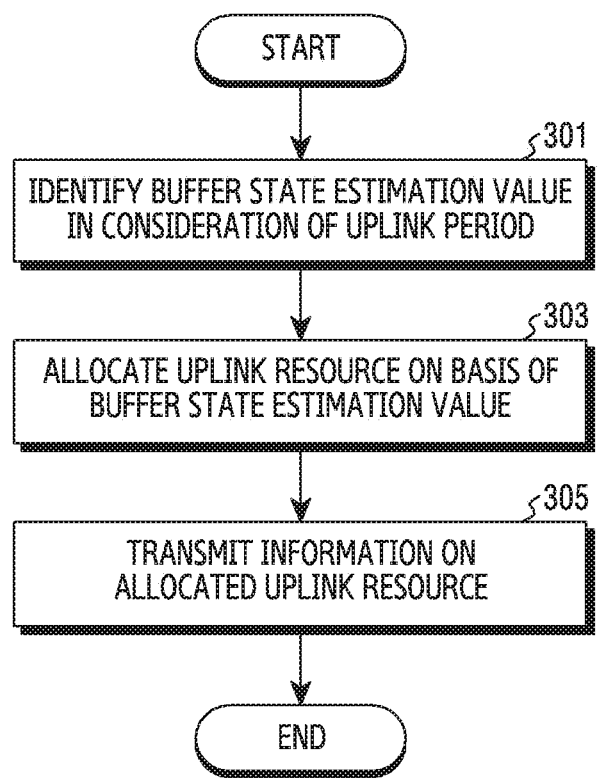
FIG. 3 illustrates a flowchart of a base station for radio resource allocation for a terminal in a wireless communication system according to various embodiments of the present disclosure.

FIG. 3 illustrates a flowchart of a base station for radio resource allocation for a terminal in a wireless communication system according to various embodiments of the present disclosure. For example, FIG. 3 illustrates the flowchart of the base station 120.

Referring to FIG. 3, in step 301, the base station identifies a buffer state estimation value of a terminal in consideration of an uplink period of the terminal. That is, the base station identifies whether to increase the buffer state estimation value of the terminal by a unit size according to a previous data uplink period received from the terminal. For example, in response to data last received from the terminal 110 being an uplink talk spurt, the base station 120 may identify that even a period needing resource allocation would be an uplink talk spurt, and update the buffer state estimation value as much as a single voice packet size. At this time, the base station 120 may identify whether to update the buffer state estimation value in consideration of whether it is a time point of periodical update of a buffer state, together.

Thereafter, in step 303, the base station allocates an uplink radio resource for the terminal on the basis of the buffer state estimation value. For example, the base station 120 may allocate the uplink radio resource for the terminal 110 on the basis of the buffer state estimation value identified in step 301. That is, the base station may set the buffer state estimation value as a buffer state value of the terminal, and allocate a radio resource. In accordance with a resource assignable by the base station 120, uplink radio resource allocation for the terminal 110 may succeed or fail. In response to the base station 120 succeeding in the radio resource allocation for the terminal 110 according to the buffer state estimation value, the base station 120 may decrease the buffer state estimation value as much as the allocated resource.

In step 305, the base station transmits information on the allocated uplink resource, to the terminal. For example, the base station 120 may transmit the information on the uplink resource allocated by the base station in step 303, to the terminal 110 through a downlink control channel.

Figure 4:
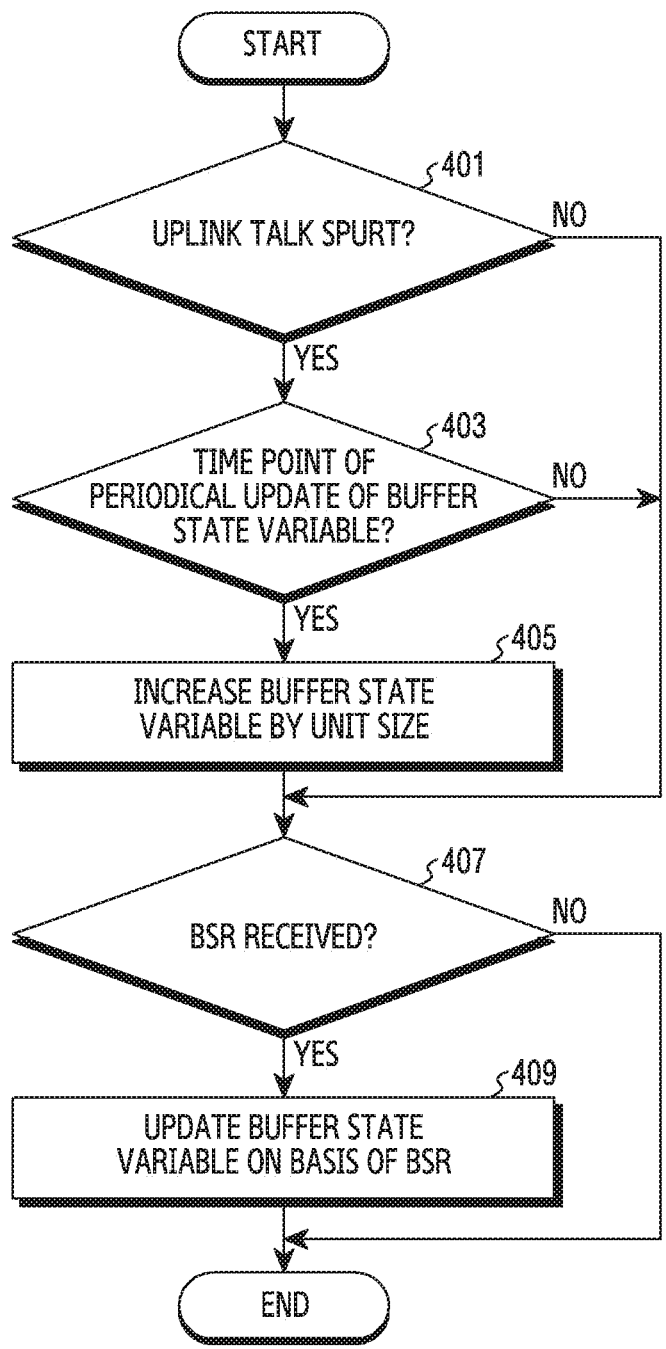
FIG. 4 illustrates a flowchart of a base station for estimating a buffer state of a terminal in a wireless communication system according to various embodiments of the present disclosure.

FIG. 4 illustrates a flowchart of a base station for estimating a buffer state of a terminal in a wireless communication system according to various embodiments of the present disclosure. For example, FIG. 4 illustrates the flowchart of the base station 120. Particularly, FIG. 4 may exemplify operations carried out by the buffer state estimating unit 242 of the base station 120.

Referring to FIG. 4, in step 401, the base station identifies whether uplink that will be transmitted by a terminal is an uplink talk spurt. That is, the base station first identifies whether the terminal is in the uplink talk spurt which is a period in which a delay of radio resource allocation particularly becomes a problem. For example, the base station 120 may identify whether uplink data last received from the terminal 110 is in the uplink talk spurt, to identify whether the uplink that will be transmitted by the terminal is currently a talk spurt. A general voice service may be divided into a talk spurt in which voice traffic is transmitted and/or received and a silence period in which the voice traffic does not exist. In response to a previous uplink period received from the terminal being the talk spurt, because of a characteristic of voice traffic, there is a very high probability in which even a current terminal uplink period is the talk spurt and therefore, by using the last received data, the base station 120 may identify whether the terminal is in the uplink talk spurt. In accordance with an embodiment, identifying the uplink talk spurt or not by the previously received data may be based on a real-time transport protocol (RTP) packet size. In general, an RTP packet transmitted in the talk spurt is less than a silence insertion descriptor (SID) that is a packet transmitted in a silence period and therefore, the base station may identify the talk spurt or not on the basis of the RTP packet size. In response to the base station identifying that it is the uplink talk spurt, the base station performs operation 403. In response to the base station identifying that it is not the uplink talk spurt, the base station performs operation 407.

In response to identifying that it is the uplink talk spurt, in step 403, the base station identifies whether it is a time point of periodical update of a buffer state variable. That is, in response to there being a need to control a delay of allocation because it is the uplink talk spurt, the base station identifies whether a time point of periodical update of a buffer state estimation value has arrived. For example, the base station 120 may identify whether it is the time point of periodical update of the buffer state variable by using an update cycle of the terminal 110 and time offset information. In detail, the update cycle of the corresponding terminal may be set identically with a voice packet provision cycle of the terminal that is identified by a specification of an audio codec mounted in the terminal. In accordance with an embodiment, in an adaptive multi-rate (AMR) audio codec mainly used in a VoLTE service, the voice packet provision cycle is 20 ms. Also, the time offset information may be set as a time point at which the corresponding terminal transmits an SR and requests for radio resource allocation. The base station has not information on an accurate time point at which a voice packet is provided by the corresponding terminal, and only information on a time point at which the corresponding terminal requests for radio resource allocation is information valid for the base station, so the time offset information may be set as the time point of requesting for the radio resource allocation. In response to the base station identifying that it is the time point of periodical update of the buffer state variable, the base station performs step 405. In response to the base station identifying that it is not the time point of periodical update of the buffer state variable, the base station performs step 407.

In response to it being identified that it is the time point of periodical update of the buffer state variable, in step 405, the base station increases the buffer state variable as much as a unit size. For example, in response to it being identified that it is the time point of periodical update of the buffer state variable (i.e., a time point at which a voice packet would be provided by the terminal), the base station may increase the buffer state variable as much as a single voice packet size. Because the single voice packet size is identified by the specification of the audio codec mounted in the corresponding terminal, the single voice packet size may be a value which is already known by the base station. Generally, the single voice packet size may be a data size transmitted in a single packet, so it is to increase the buffer state estimation value as much as the single voice packet size. In accordance with other embodiments, the unit size of increasing the buffer state variable may be set as another value according to a transmitted packet size.

Thereafter, in step 407, the base station identifies whether a BSR has been received from the terminal. For example, the base station 120 may identify whether the BSR has been received from the terminal 110 at a current time point. In response to the base station receiving the BSR from the terminal, the base station performs 409. In response to the base station failing to receive the BSR, the base station terminates the present algorithm.

In response to the base station receiving the BSR from the corresponding terminal, in step 409, the base station updates the buffer state variable on the basis of the BSR. That is, the base station updates the buffer state variable into a value that is reported according to the BSR received from the terminal. For example, in response to the base station 120 receiving the BSR from the terminal 110 at a current time point, the base station 120 may disregard the buffer state estimation value accumulated in step 405 and set the buffer state variable as the received BSR value. The value identified in step 405 is nothing but a value estimating the buffer state of the terminal and therefore, in response to there being an actual BSR received from the terminal, it is for updating the buffer state variable on the basis of the BSR reported from the terminal, to prevent a resource from being unnecessarily allocated or insufficiently allocated. By this estimation scheme, the efficiency of the whole system for uplink resource allocation may be improved.

Figure 5:
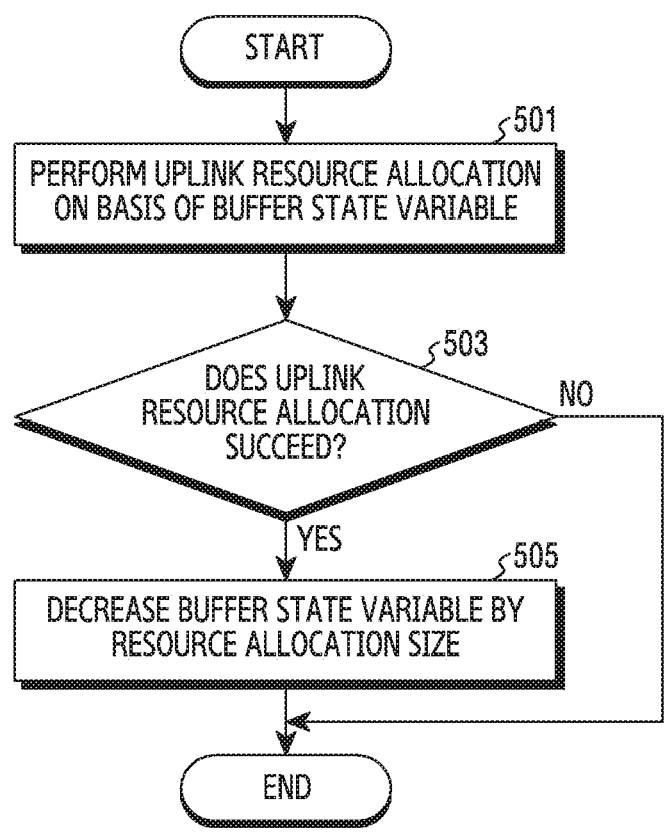
FIG. 5 illustrates a flowchart of a base station for allocating a radio resource on the basis of a buffer state estimation value in a wireless communication system according to various embodiments of the present disclosure.

FIG. 5 illustrates a flowchart of a base station for allocating a radio resource on the basis of a buffer state variable in a wireless communication system according to various embodiments of the present disclosure. For example, FIG. 5 illustrates the flowchart of the base station 120. Particularly, FIG. 5 may exemplify operations carried out by the resource allocating unit 244 of the base station 120.

Referring to FIG. 5, in step 501, the base station performs uplink resource allocation on the basis of a buffer state variable. For example, the base station 120 may perform the uplink radio resource allocation for the terminal 110 by using the buffer state variable identified through the above-described steps of FIG. 4. In accordance with an embodiment, the base station may search for an available radio resource, and identify a size of allocation resource according to the buffer state variable.

Thereafter, in step 503, the base station identifies whether the base station has succeeded in the uplink resource allocation. For example, the base station 120 may identify whether a resource of a predetermined size has been allocated to the terminal 110 according to the buffer state variable and the available radio resource. Even though the buffer state variable of the corresponding terminal is not 0, it may fail to allocate a resource to the corresponding terminal according to resource allocation requests of other terminals and the available radio resource. In response to identifying that the base station has succeeded in the uplink resource allocation for the corresponding terminal, the base station performs step 505. In response to identifying that the base station has failed in the uplink resource allocation for the corresponding terminal, the base station terminates the present algorithm.

In response to identifying that the base station has succeeded in the uplink resource allocation for the corresponding terminal, in step 505, the base station decreases the buffer state variable as much as a resource allocation size. For example, in response to succeeding in the uplink radio resource allocation for the terminal 110, the base station 120 may decrease the buffer state variable as much as an uplink radio resource allocation size. In accordance with an embodiment, the resource allocating unit 244 may receive a variable value on a buffer state estimation value as an input from the buffer state estimating unit 242, and return the buffer state estimation value decreased as much as the resource allocation size, to the buffer state estimating unit 242.

In accordance with various embodiments of the present disclosure, steps of FIG. 4 and FIG. 5 may be performed as a series of processes by a scheduler which includes the buffer state estimating unit 242 and the resource allocating unit 244. At this time, steps of FIG. 4 and FIG. 5 may be carried out at the same system time. In response to steps of FIG. 4 and FIG. 5 being ended, the system time may be increased. In LTE of an embodiment, the system time may be increased by the unit of 1 millisecond (ms). Steps of FIG. 4 and FIG. 5 may be repeatedly performed whenever the system time is increased.

Figure 6:
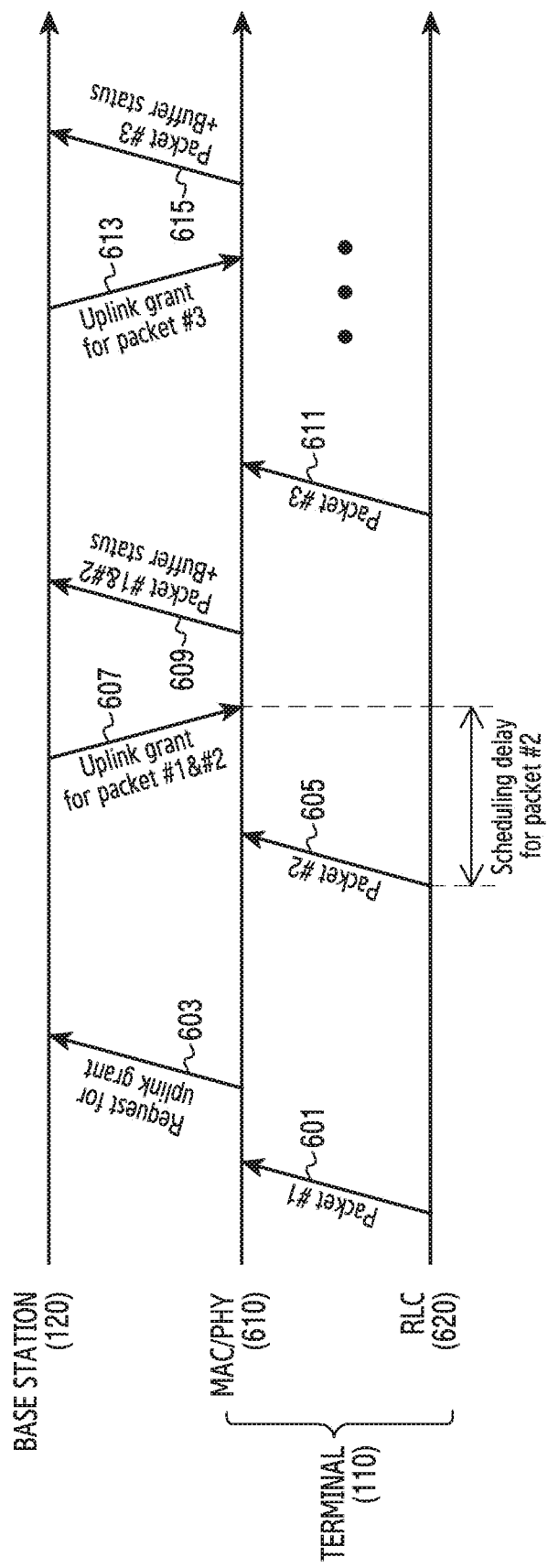
FIG. 6 illustrates a procedure for allocating a radio resource between a base station and a terminal and transmitting data in a wireless communication system according to various embodiments of the present disclosure.

FIG. 6 illustrates a procedure for allocating a radio resource between a base station and a terminal and transmitting data in a wireless communication system according to various embodiments of the present disclosure. For example, FIG. 6 illustrates an operation flow of the base station 120 and the terminal 110. Particularly, the terminal 110 may include a MAC/PHY layer 610 and an RLC layer 620.

Referring to FIG. 6, in step 601, a packet #1 provided by an RLC layer of the terminal is delivered to a MAC/PHY layer of the terminal. For example, in response to a voice packet being provided, the RLC layer 620 of the terminal 110 may deliver the provided packet #1 to the MAC/PHY layer 610 in order to transmit to the base station 120.

Thereafter, in step 603, the terminal transmits a request for radio resource allocation (request for uplink grant) to the base station. For example, because a packet that will be transmitted has been provided, the terminal 110 may transmit a request for uplink radio resource allocation to the base station 120. The request for radio resource allocation may be accomplished through SR or BSR transmission of the terminal.

In step 605, a packet #2 provided in the RLC layer of the terminal is delivered to the MAC/PHY layer of the terminal. For example, in response to a new voice packet being provided before the reception of a response of the base station 120 to the request for radio resource allocation already made, the RLC layer 620 of the terminal 110 may deliver the provided packet #2 to the MAC/PHY layer 610. In accordance with an embodiment, in a situation in which a plurality of terminals produce resource allocation competition, a delay of radio resource allocation information transmission (UL grant delay) for the terminal may be provided. At this time, the delay of radio resource allocation information transmission may mean a difference from a time point at which the base station receives the request for radio resource allocation, to a time point of transmitting radio resource allocation information to the terminal. Due to this, before the transmission of the radio resource allocation information from the base station, the packet #2 may be delivered from the RLC layer 620 of the terminal 110 to the MAC/PHY layer 610.

In step 607, the terminal receives radio resource allocation information on the packet #1 and the packet #2 from the base station. For example, the terminal 110 may receive, from the base station 120, the radio resource allocation information which is allocated for the packet #1 and packet #2 on the basis of buffer state estimation. At this time, the base station 120 may update a buffer state estimation value through the above-described steps of FIG. 4 and FIG. 5, and may transmit the radio resource allocation information on the packet #1 and packet #2 which have been already provided by the terminal on the basis of the updated buffer state estimation value.

In the conventional art, even if a packet #2 has been already provided and thus a buffer size is increased, the base station transmits only radio resource allocation information on the packet #1 to the terminal according to the received request for radio resource allocation. Resultantly, the terminal transmits the packet #1 through an allocated radio resource, and a request for radio resource allocation for the packet #2 is performed through a BSR which is transmitted together at transmission of the packet #1. At this time, a delay of radio resource allocation (scheduling delay) for the packet #2 may be relatively much lengthened because the radio resource allocation proceeds after the reception of the BSR. The delay of radio resource allocation may mean a difference from a time point at which a packet is provided in the RLC layer of the terminal, to a time point of receiving the radio resource allocation information. In accordance with an embodiment, the delay of radio resource allocation for the packet #2 according to the conventional art may be expressed as in <Equation 1>.

$$(\text{UL grant delay}) \leq (\text{scheduling delay}) \leq 2 \times (\text{UL grant delay}) \quad \text{Equation 1}$$

In <Equation 1>, the delay of radio resource allocation (scheduling delay) may mean a difference from a time point at which a packet is provided in an RLC layer of a terminal to a time point of receiving radio resource allocation information, and a delay of radio resource allocation information transmission (UL grant delay) may mean a difference from a time point at which the base station receives a request for radio resource allocation to a time point of transmitting the radio resource allocation information to the terminal. <Equation 1> excludes a delay from the time point of transmission of the radio resource allocation information to a time point of data transmission (packet transmission).

On the other hand, in accordance with an embodiment of the present disclosure, in a radio resource allocation method based on buffer state estimation, a delay of radio resource allocation for a packet #2 may be expressed as in <Equation 2>.

$$0 \le (\text{scheduling delay}) \le (\text{UL grant delay}) \quad \text{Equation 2}$$

In <Equation 2>, a delay of radio resource allocation (scheduling delay) may mean a difference from a time point at which a packet is provided in an RLC layer of a terminal to a time point of receiving radio resource allocation information, and a delay of radio resource allocation information transmission (UL grant delay) may mean a difference from a time point at which the base station receives a request for radio resource allocation to a time point of transmitting radio resource allocation information to the terminal. <Equation 1> excludes a delay from the time point of transmission of the radio resource allocation information to a time point of data transmission (packet transmission).

In a comparison of the above-described <Equation 1> and <Equation 2>, it may be identified that in the conventional scheme, a delay of radio resource allocation is greater than a delay of radio resource allocation information transmission, whereas in a radio resource allocation method based on buffer state estimation of an embodiment of the present disclosure, the delay of radio resource allocation is smaller than the delay of radio resource allocation information transmission. That is, when applying the radio resource allocation method based on the buffer state estimation according to an embodiment of the present disclosure, it may be identified that the delay of radio resource allocation is decreased, and accordingly to this, an increment of a voice service user capability may be made possible. The voice service user capability may mean the maximum number of voice service users satisfying a condition of a voice service delay requirement.

Thereafter, in step 609, the terminal transmits the packet #1 and packet #2 and the BSR to the base station. For example, the terminal 110 may transmit the packet #1 and the packet #2 by means of the radio resource allocated from the base station 120, and transmit the BSR together with the packet #1 and the packet #2. The BSR may be periodically transmitted from the terminal. In response to an amount of padding required for adapting to a scheduled transmission block size being greater than a size of the BSR, the BSR instead of the padding may be inserted and transmitted, together with data.

In step 611, a packet #3 provided in the RLC layer of the terminal is delivered to the MAC/PHY layer of the terminal. For example, in response to the voice packet #3 being provided, the RLC layer 620 of the terminal 110 may deliver the provided packet #3 to the MAC/PHY layer 610 in order to transmit to the base station 120.

In step 613, the terminal receives radio resource allocation information on the packet #3 from the base station. For example, the terminal 110 may receive the radio resource allocation information allocated for the packet #3 from the base station 120. At this time, the base station 120 may receive a request for radio resource allocation such as an SR or a BSR from the terminal 110, to transmit the radio resource allocation information allocated by the request. In accordance with other embodiments, the base station may update the buffer state estimation value through the above-described steps of FIG. 4 and FIG. 5, and may transmit the radio resource allocation information on the packet #3 which is provided by the terminal on the basis of the updated buffer state estimation value.

Thereafter, in step 615, the terminal transmits the packet #3 and the BSR to the base station. For example, the terminal 110 may transmit the packet #3 by means of the radio resource allocated from the base station 120, and transmit the BSR together with the packet #3. The BSR may be periodically transmitted from the terminal. In response to an amount of padding required for adapting to a scheduled transmission block size being greater than a size of the BSR, the BSR instead of the padding may be inserted and transmitted together with data.

Methods of embodiments mentioned in the claims or specification of the disclosure may be implemented in the form of hardware, software or a combination of the hardware and the software.

In response to being implemented by the software, a computer-readable storage media storing one or more programs (i.e., software modules) may be provided. The one or more programs stored in the computer-readable storage media are configured to be executable by one or more processors of an electronic device. The one or more programs include instructions for enabling the electronic device to execute the methods of the embodiments stated in the claims or specification of the disclosure.

This program (i.e., a software module, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or an optical storage device of another form, and/or a magnetic cassette. Or, the program may be stored in a memory that is configured in combination of some or all of them. Also, each configured memory may be included in plural as well.

Also, the program may be stored in an attachable storage device that may access through a communication network such as the Internet, an intranet, a local area network (LAN), a wireless LAN (WLAN) and a storage area network (SAN), or a communication network constructed by a combination of them. This storage device may access a device performing an embodiment of the present disclosure through an external port. Also, a separate storage device on the communication network may access the device performing the embodiment of the present disclosure as well.

In the aforementioned concrete embodiments of the disclosure, constituent elements included in the disclosure have been expressed in the singular or plural according to a proposed concrete embodiment. But, the expression of the singular form or plural form is selected suitable to a given situation for the sake of description convenience, and the present disclosure is not limited to singular or plural constituent elements. Even if a constituent element is expressed in the plural form, it may be constructed in the singular form, or even if a constituent element is expressed in the singular form, it may be constructed in the plural form.

While a detailed description of the present disclosure has been made for a concrete embodiment, it is undoubted that various modifications are available without departing from the scope of the present disclosure. Therefore, the scope of the present disclosure should not be limited to and defined by the explained embodiment and should be defined by not only the scope of claims mentioned below but also equivalents to the scope of these claims.

The invention claimed is:

1. A method performed by a base station in a wireless communication system, the method comprising:
   identifying a buffer state estimation value of a terminal based on whether a size of a first packet is smaller than a size of a second packet;
   allocating an uplink radio resource for the terminal based on the buffer state estimation value; and
   transmitting information on the allocated uplink radio resource to the terminal,
   wherein the first packet is received or transmitted in a first period, the first period being associated with an uplink talk spurt, and
   wherein the second packet is received or transmitted in a second period, the second period being not associated with the uplink talk spurt.

2. The method of claim 1, wherein the identifying of the buffer state estimation value of the terminal comprises:
   in response to an uplink signal being identified as being in the uplink talk spurt, identifying whether to update the buffer state estimation value; and
   in response to the buffer state estimation value being identified to be updated, increasing the buffer state estimation value by a unit size.

3. The method of claim 2, wherein the identifying of whether to update the buffer state estimation value comprises:
   setting a voice packet provision cycle of the terminal as an update cycle;
   setting a time point of request for radio resource allocation received from the terminal, as offset information; and
   identifying whether to update the buffer state estimation value based on the update cycle and the offset information.

4. The method of claim 3, wherein the voice packet provision cycle of the terminal is identified by an audio codec used in the terminal.

5. The method of claim 2, wherein the identifying of the buffer state estimation value of the terminal comprises:
   identifying whether a buffer status report (BSR) has been received from the terminal; and
   in response to identifying that the BSR has been received from the terminal, setting the buffer state estimation value as a BSR value.

6. The method of claim 2, wherein the unit size is identified according to a single voice packet size that is based on an audio codec used in the terminal.

7. The method of claim 1, wherein the identifying of the buffer state estimation value of the terminal comprises:
   identifying that the uplink signal is in the uplink talk spurt based on whether the last packet received from the terminal is in the uplink talk spurt; and
   in response to the uplink signal being in the uplink talk spurt, increasing the buffer state estimation value of the terminal by a unit size.

8. The method of claim 7, wherein whether the last packet received from the terminal is in the uplink talk spurt is identified based on a size of a real-time transport protocol (RTP) packet received from the terminal.

9. The method of claim 1, wherein the allocating of the uplink radio resource for the terminal comprises:
   allocating the uplink radio resource for the terminal based on the buffer state estimation value and an available radio resource; and
   in response to the uplink radio resource for the terminal being allocated, decreasing the buffer state estimation value by the allocated uplink radio resource.

10. The method of claim 1, further comprising: receiving data and a buffer status report (BSR) from the terminal based on the information on the allocated uplink radio resource.

11. A base station in a wireless communication system, the base station comprising,
    at least one processor configured to:
      identify a buffer state estimation value of a terminal based on whether a size of a first packet is smaller than a size of a second packet, and
      allocate an uplink radio resource for the terminal based on the buffer state estimation value; and
    a transceiver configured to transmit information on the allocated uplink radio resource to the terminal,
    wherein the first packet is received or transmitted in a first period, the first period being associated with an uplink talk spurt, and
    wherein the second packet is received or transmitted in a second period, the second period being not associated with the uplink talk spurt.

12. The base station of claim 11, wherein the at least one processor is further configured to:
    in response to an uplink signal being identified as being in the uplink talk spurt, identify whether to update the buffer state estimation value; and
    in response to the buffer state estimation value being identified to be update, increase the buffer state estimation value by a unit size.

13. The base station of claim 12, wherein the at least one processor is further configured to:
    set a voice packet provision cycle of the terminal as an update cycle,
    set a time point of request for radio resource allocation received from the terminal, as offset information, and
    identify to update the buffer state estimation value based on the update cycle and the offset information.

14. The base station of claim 13, wherein the voice packet provision cycle of the terminal is identified by an audio codec used in the terminal.

15. The base station of claim 12, wherein the unit size is identified according to a single voice packet size that is based on an audio codec used in the terminal.

16. The base station of claim 12, wherein the at least one processor is further configured to:
    identify whether a buffer status report (BSR) has been received from the terminal, and
    in response to the BSR has been received from the terminal, set the buffer state estimation value as a BSR value.

17. The base station of claim 11, wherein the at least one processor is further configured to:
    identify that the uplink signal is in the uplink talk spurt based on whether the last packet received from the terminal is in the uplink talk spurt, and
    in response to the uplink signal being in the uplink talk spurt, increase the buffer state estimation value of the terminal by a unit size.

18. The base station of claim 17, wherein whether the last packet received from the terminal is in the uplink talk spurt is identified based on a size of a real-time transport protocol (RTP) packet received from the terminal.

19. The base station of claim 11, wherein the at least one processor is further configured to:
   allocate the uplink radio resource for the terminal based on the buffer state estimation value and an available radio resource, and
   in response to the uplink radio resource for the terminal being allocated, decrease the buffer state estimation value by the allocated uplink radio resource.

20. The base station of claim 11, wherein the at least one processor is further configured to receive data and a buffer status report (BSR) from the terminal based on the information on the allocated uplink radio resource.

* * * * *